United States Patent [19]

Simkulak et al.

[11] Patent Number: 5,087,187

[45] Date of Patent: Feb. 11, 1992

[54] APPARATUS FOR MOLDING HOLLOW COMPOSITE ARTICLES HAVING INTERNAL REINFORCEMENT STRUCTURES

[75] Inventors: Richard J. Simkulak, Meriden; Terry M. Boustead, West Haven, both of Conn.; Robert L. Folts, St. Charles, Mo.; George N. Sepe, Trumbull, Conn.

[73] Assignee: United Technologies Corporation, Hartford, Conn.

[21] Appl. No.: 491,408

[22] Filed: Mar. 9, 1990

[51] Int. Cl.⁵ .................................. B29C 43/04
[52] U.S. Cl. ............................ 425/112; 425/116; 425/128; 425/390; 425/393; 425/395; 425/397; 425/405.1; 264/258; 264/313
[58] Field of Search ............ 264/101, 102, 257, 258, 264/313, 314, 317, 319, 324, 325, 510, 512; 425/112, 116, 121, 123, 128, 395, 397, 403, 405.1, 387.1, 388, 390, 392, 393, 394

[56] References Cited

U.S. PATENT DOCUMENTS

| | | | |
|---|---|---|---|
| 2,945,655 | 7/1960 | Snyder | 244/123 |
| 3,962,506 | 6/1976 | Dunahoo | 428/158 |
| 3,967,996 | 7/1976 | Kamov et al. | 156/156 |
| 4,169,749 | 10/1979 | Clark | 156/156 |
| 4,292,101 | 9/1981 | Reichert | 156/156 |
| 4,565,595 | 1/1986 | Whitener | 156/156 |
| 4,662,587 | 5/1987 | Whitener | 244/117 |

Primary Examiner—Jay H. Woo
Assistant Examiner—Jeremiah F. Durkin, II

[57] ABSTRACT

An apparatus for molding hollow composite articles having a plurality of internal webs. A mandrel assembly apparatus includes slidable sidewall members, an inflatable pressure membrane surrounding the length of the slidable sidewall members and actuator means mounted on the interior of the sidewall members for lateral displacement thereof together with the inflatable membrane. Adjacent mandrel assemblies accurately position the internal webs of the composite article mechanically, while the inflatable membranes serve to compact the web laminates. The expandable sidewall members also prevent bridging or tearing of the pressure membrane associated with the formation of inner corner radii.

6 Claims, 4 Drawing Sheets

APPARATUS FOR MOLDING HOLLOW COMPOSITE ARTICLES HAVING INTERNAL REINFORCEMENT STRUCTURES

TECHNICAL FIELD

The present invention relates to a method and apparatus for molding hollow composite articles having a plurality of internal webs.

BACKGROUND ART

Composite aerospace structures such as tailfins, wings, canards, and other control surfaces are usually hollow and generally have internal spar webs for structural reinforcement. The location and alignment of these spar webs determines the strength and stiffness of the fabricated part as well as its ability to mate with adjoining assemblies. To eliminate problems of adhesion between structural elements and improve the strength of the finished part, it is highly desirable to cure spar webs integrally with the shell of the part to be molded.

Composite structures with integral spar webs were previously molded using uncontrollable inflatable nylon bags and fixed-size hard mandrels. These nylon bags provided good pressure during curing of the laminate but were prone to tearing. When this occurred, the part and mold had to be removed from the autoclave, vacuum rechecked and/or rebagged, and reinserted into the autoclave for cure. This was a time consuming process which sometimes approached the maximum handling time of the pre-preg material. Exceeding this maximum handling time meant that the pre-preg might not bond and cure properly, and that the part would have to be discarded.

The fixed-size mandrels were typically located centrally within each of the internal cavities of the mold. The mandrels were sized approximately 0.250 inch per side smaller than the internal dimensions of the final part size to allow for the lay-up of the part's laminates.

Because of their undersize condition, fixed-size mandrels were deficient in controlling the positions of the critical spar webs and spar extensions. Spar extensions are continuations of the internal spars which project beyond the skin of the part and are used to fasten the part to the fuselage.

As a result of the mandrels (100) being smaller than the part size, the spar webs were able to move in the space between adjacent mandrels during the forming process (See FIG. 1). Cured spar webs exhibited an unacceptable amount of waviness (101) and were not accurately positioned at their ideal locations. The waviness caused a reduction in the physical properties of the cured composite structure and the mislocation of spar extensions (102) caused interface problems in the next assembly operation of the part. If the mislocation tolerance was exceeded, considerable rework was required, and possibly a costly major assembly could be scrapped.

U.S. Pat. No. 3,962,506 describes a flexible and inflatable mandrel for producing hollow products having non-circular cross-sections. Although commonly used in composites molding, uncontrolled inflatable apparatus do not provide for the accurate alignment and control of the spar webs required in our application.

DISCLOSURE OF INVENTION

The invention relates to a method and apparatus for molding hollow composite articles having a plurality of internal webs.

The method according to the invention may be most advantageously used to improve the quality and accuracy of composite aircraft structures such as wings, fins, and other hollow control surfaces having integrally cured spar webs. These spar webs function as reinforcements within the structure and contribute to the strength and stiffness of the finished part.

The new molding and curing method disclosed is designed to eliminate the problems associated with the use of uncontrollable inflatable bags and fixed-sized hard mandrels in molding aircraft parts. In order to eliminate the waviness in spar webs and the mislocation of spar extensions, while providing a homogeneous laminate quality, a mold assembly was designed to include expandable mandrels, means to accurately locate the spars, and inflatable pressure membranes to uniformly compress the laminates.

The expandable mandrels, in a compressed position during the lay-up process, provide adequate room for lay-up with non-debulked materials. Expanding the mandrels before the curing cycle prepositions the spars, assures spar straightness, and avoids the waviness problems associated with fixed size mandrels. The mandrels may be expanded by a variety of means, such as pneumatic cylinders, wedge and roller assemblies, or hydraulics.

The precise location of integral spar webs is achieved by a plurality of hard stops on each end of the mold. These stops limit the expansion of the mandrels. Since the sequence of activation of the expandable mandrels is critical in order to precisely set the spar web locations in the part, a manifold is preferably incorporated to ensure that only the proper sequence of operations of the mandrels is possible.

An inflatable pressure membrane is incorporated to form the interior surfaces of the part. This allows the drawing of a vacuum between the inner mold surface and the membrane, capturing the part therebetween. A membrane with a high degree of elasticity is preferred, so that it will form tightly onto the mandrels during the lay-up process but expand freely when vacuum and heat are applied to tightly compress the laminate material during the cure cycle. The flexible pressure membranes apply uniform pressure to the laminate pre-preg, thereby avoiding resin rich and resin poor areas in the finished part.

The foregoing and other features and advantages of the present invention will become more apparent from the following description and accompanying drawings.

BEST MODE FOR CARRYING OUT THE INVENTION

Figure 2:
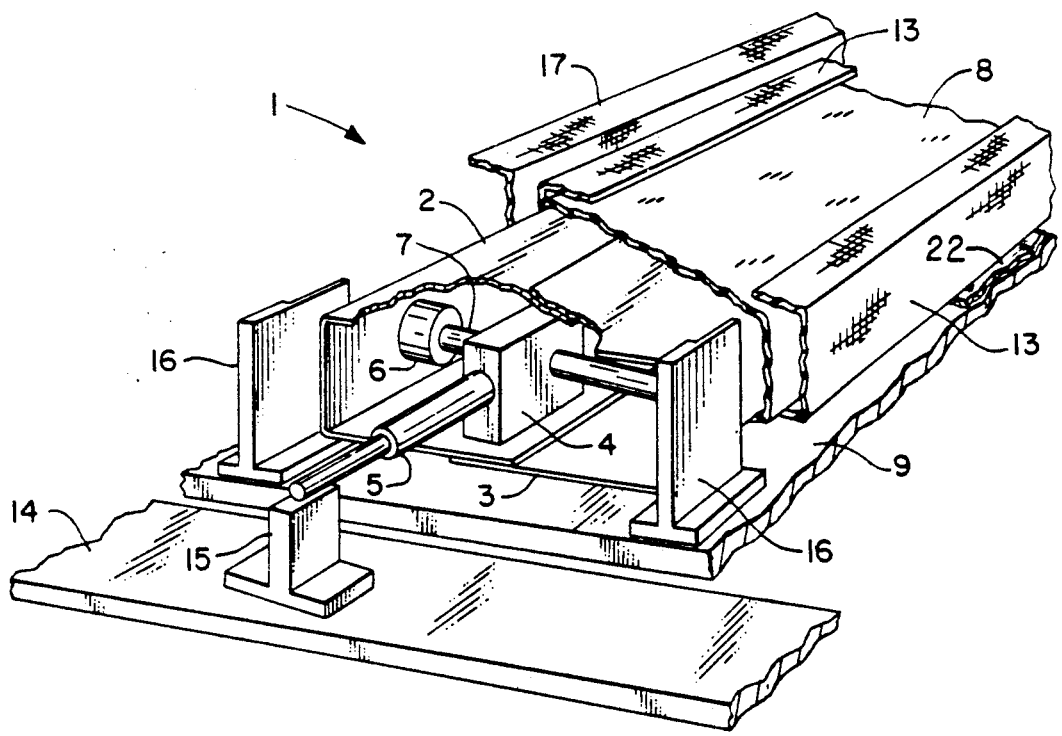
FIG. 2 illustrates the expandable mandrel design.
Figure 1:
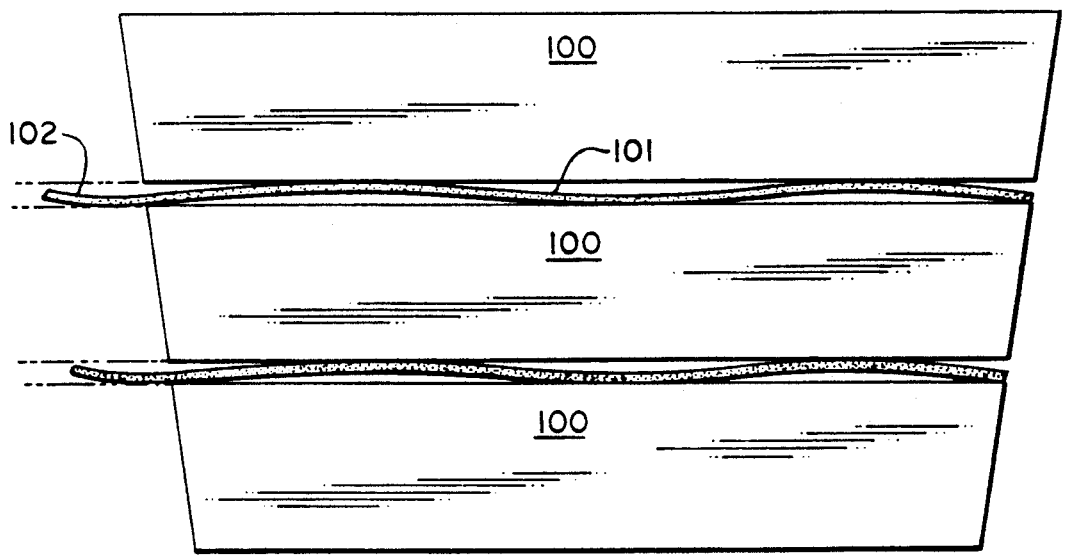
FIG. 1 illustrates the spar web waviness problem and spar extension offset associated with fixed-size mandrels.

Referring now to the drawings, it is the molding of hollow composite articles having a plurality of internal webs with which this invention is concerned. In particular, the invention is used to manufacture aircraft tail-fins.

FIG. 2 illustrates an expandable mandrel apparatus. The mandrels may be constructed of aluminum and consist of a set of slidable sidewall members. There is an interior sidewall member (2) and an exterior sidewall member (3). The interior sidewall member (2) can slide within the exterior side wall member (3) to adjust the width of the mandrel (1). At the ends of the interior sidewall member (2) are located a vertical support braces(4) which are attached to mandrel support posts (5).

Within each mandrel is a set of four pneumatic cylinders (6), transversely mounted between the two slidable wall members. The cylinders (6) have two chambers. A differential pressure can be created within these chambers that will cause one chamber to expand, extending an attached cylinder rod (7), and causing the sidewall plates connected thereto to move apart.

Surrounding the length of the expandable mandrel is an inflatable pressure membrane (8). In this preferred embodiment the membrane (8) is composed of silicone rubber. The silicone material allows the drawing of a vacuum between the inner mold surfaces and the silicone membrane, capturing the part within. The silicone membranes form well to the 0.125 inch typical inner radii of the part without the tearing problem associated with nylon membranes. The silicone membranes actually extend beyond the lay-up areas and beyond the ends of the mandrels to facilitate the sealing of the mold cavity into an air tight enclosure.

The pre-preg materials used to form the spars webs (13, 17) are laid up on what may be called rain gutter forms to construct a "C"-shaped article. In this application, the material is 5225W epoxy resin and a graphite epoxy pre-preg produced by Narmco, Inc. (Anaheim, Calif.). The pre-formed pre-pregs (13, 17) are placed onto the silicone membrane covered mandrels.

Adjacent to each end of the lower mold section is a bracket support plate (14). On this bracket support plate (14) are mounted mandrel alignment brackets (15). These alignment brackets (15) support the mandrels (1) in the lower mold section (9) and align the mandrels lengthwise in the mold cavity.

Figure 3:
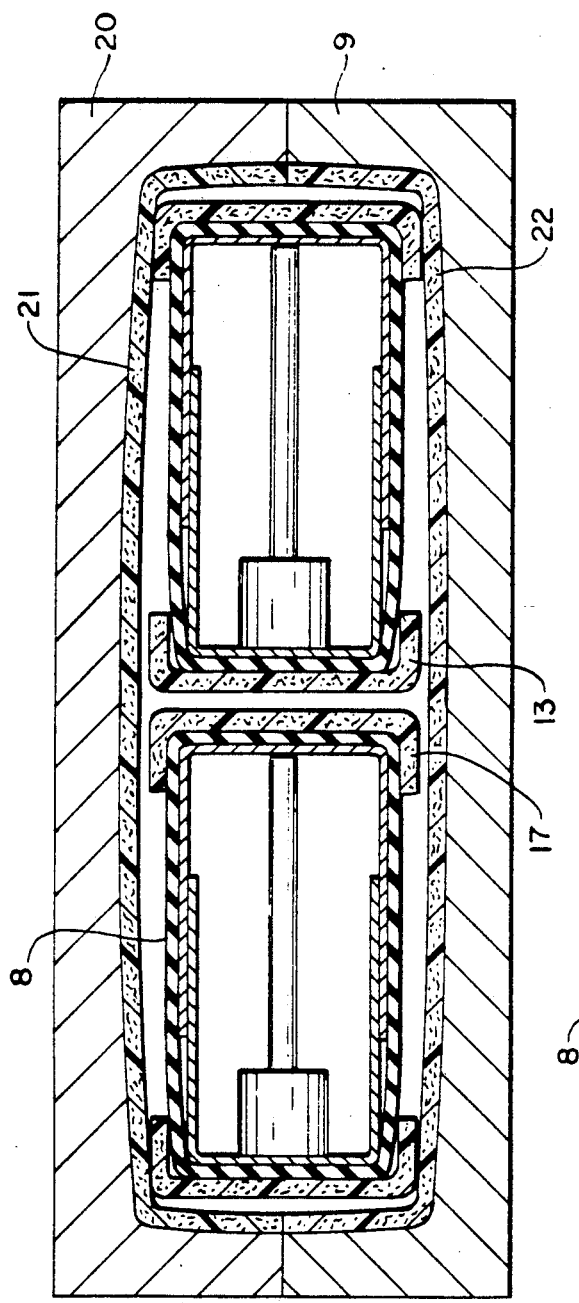
FIG. 3 illustrates adjacent mandrels in a mold in their contracted position.

The lower mold section (9) is lined with woven pre-preg material (22) which forms the skin of the fin. The prepared mandrels are then placed in said mold adjacent to each other in a spaced apart arrangement and supported at each end by said alignment brackets (15). (See FIG. 3).

Located at the ends of the lower mold section (9) are a plurality of spar locators (16) which act as hard stops to the mandrels expansion. These locators (16) set the precise chordwise location of the spars when the mandrels are expanded. Locators (16) are generally the same thickness as the two adjoining preform pre-preg layers (13, 17). When the mandrels expand, the pre-preg layers (13, 17) are brought into contact with each other, but are not compressed.

Figure 4:
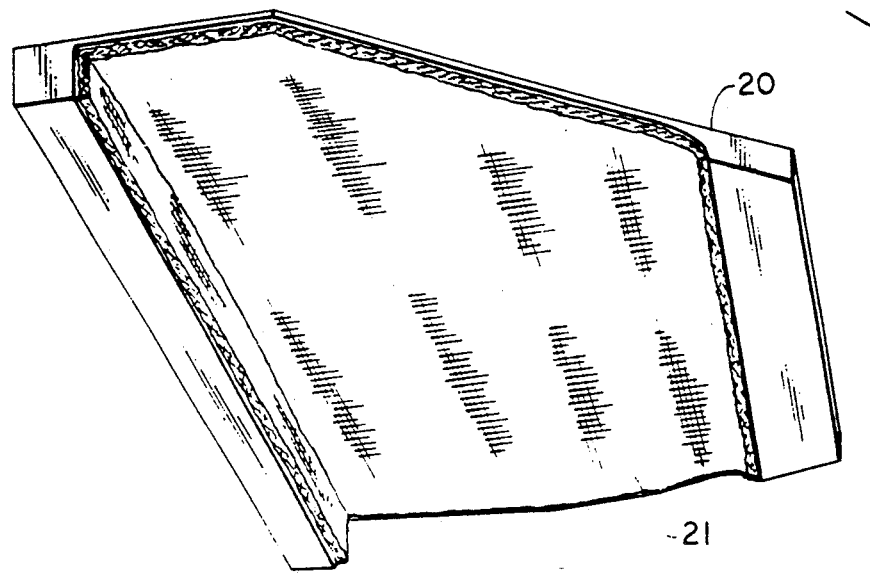
FIG. 4 illustrates the mold assembly.
Figure 4:
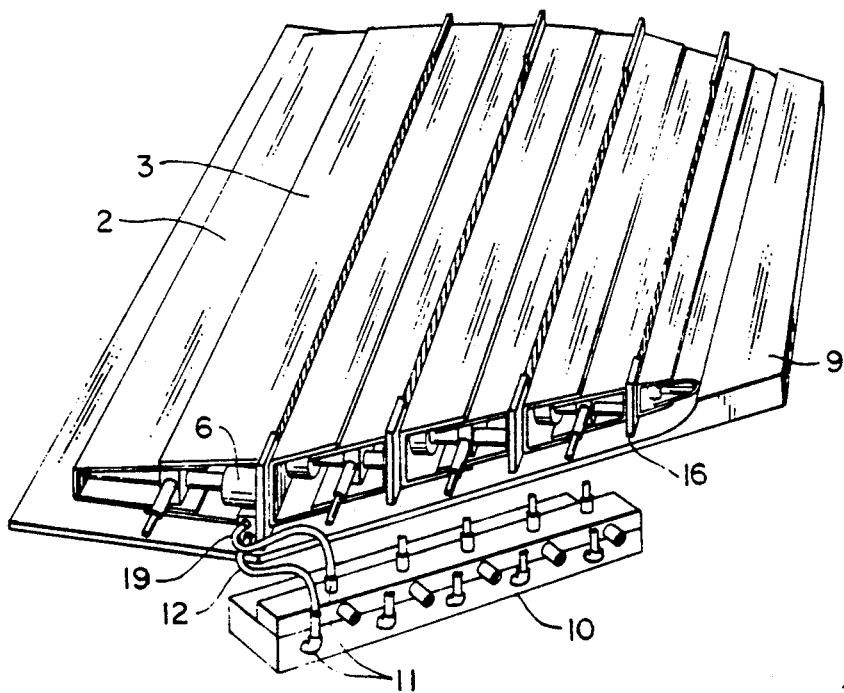

Referring now to FIG. 4, located on an extension of the lower mold section (9) is a manifold (10), bearing quick connect couplings (11), attached to which are air lines (12) and vacuum lines (19) which are connected to the pneumatic cylinders (6) to supply pressurized air and vacuum during the molding process. The pneumatic cylinders (6) within individual mandrels are connected in series to ensure even expansion of the mandrel along its length.

The upper mold section (20), previously lined with woven pre-preg (21) to form the outer skin of the fin, is placed over the lower mold section containing the mandrels and the two sections are bolted together. Air lines (12) connected to the pneumatic cylinders (6) are attached to the manifold.

Figure 5:
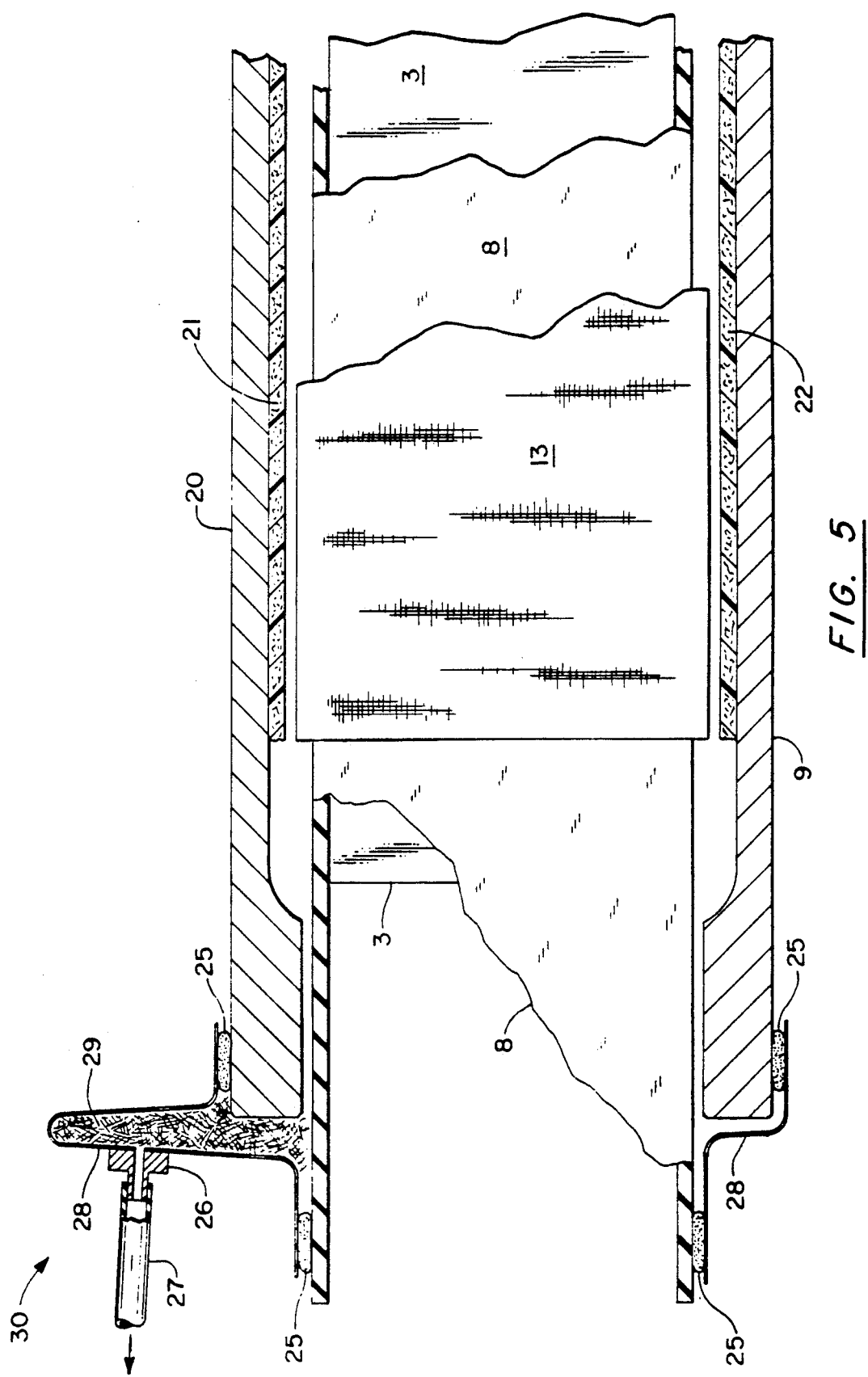
FIG. 5 is a cut-away side view illustrating the location of the press-tight adhesive and vacuum valve which allow a vacuum to be drawn on the mold cavity.

As previously described, the inflatable pressure membranes (8) surround the expandable mandrels like tubes and extend beyond the length of the mandrels and the mold. (See FIG. 5). This allows the edges of these membranes to be sealed to adjacent pressure membranes on either side and to the upper and lower mold sections. The cavity between the membrane (8) and the mold is sealed by means of a tacky nonhardening press-tight adhesive (25) such as GS-213 sealant tape, a high temperature, medium pressure, butyl rubber sealing agent, by Air Tech International, Inc. (Carson, Calif.) in conjunction with a nylon bagging film (28). A bead of adhesive (25) is applied to the outer edge of the membrane (8) and to the end of the exterior surface of the mold sections. Nylon bagging film (28) is wrapped around the ends of the mold and secured with the adhesive (25). This completely seals the mold cavity containing the pre-preg materials and allows a vacuum to be drawn on the cavity during the molding process. At either end of the mold a large ear fold (30) is formed by the bagging film (28) to provide sites for mounting vacuum valves (26). Within the ear fold (30) is a woven cloth gauze (29) to provide an open channel for air withdrawal. The vacuum valve (26) is connected to a vacuum hose (27) during the molding process to effect evacuation of the mold cavity during the cure cycle.

Prior to the cure cycle, the manifold (10) is attached to an exterior supply of compressed air and the mandrels (1) expanded until they contact the spar locators (16) to precisely set the location of the spars webs.

The entire mold assembly, and manifold are placed in an autoclave. The mold assembly and enclosed pre-preg is subjected to sufficient heat and pressure to bond adjacent pre-preg materials and convert them to void free composites. In this application the autoclave pressure is about 50 psi, and the temperature is about 350° F.

During the cure process, a vacuum is drawn on one chamber of the pneumatic cylinders (6), while the other chamber is exposed to autoclave pressure via the manifold. This causes the mandrels to remain at their fully expanded position, taking up the 0.250 inch gap normally seen with fixed-size mandrels.

Figure 6:
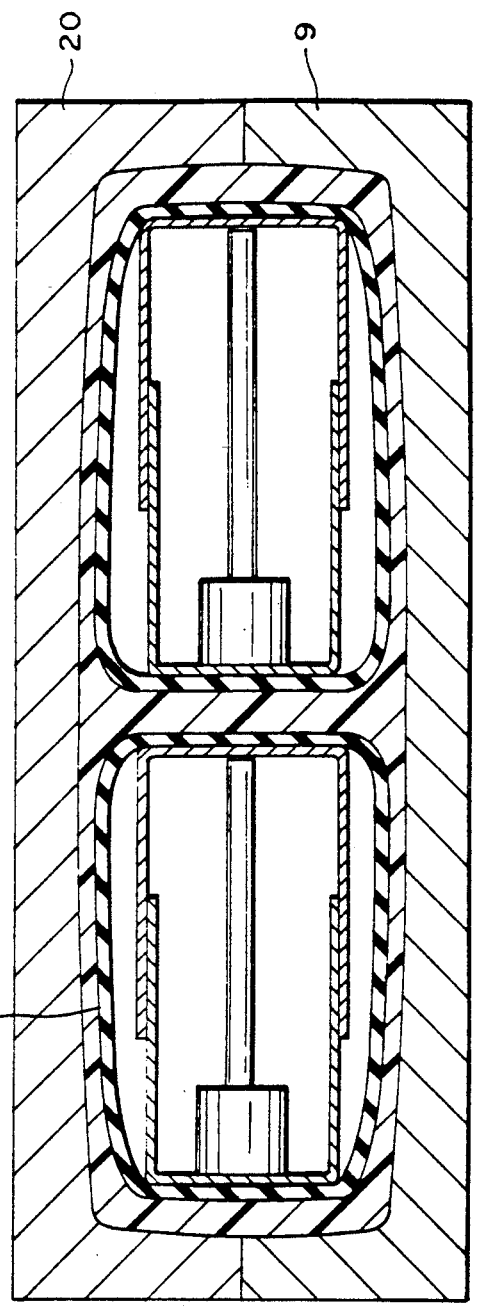
FIG. 6 illustrates adjacent mandrels in a mold in their expanded position and the pressure membranes fully inflated.

While the mold cavity is evacuated, autoclave pressure pressing on the inside of the inflatable pressure membranes(8) causes them to expand like a balloon, compressing the adjacent pre-preg pre-forms (13, 17) together to form composite spars. The expandable membrane also compresses the edges of the spars against the pre-preg lined mold cavities to integrally bond the spars webs to the skin. (See FIG. 6) Typically the composite pre-preg is held at the designated temperature and pressure for 3 hours.

Although this invention has been shown and described with respect to detailed embodiments thereof, it will be understood by those skilled in the art that various changes in form and detail thereof may be made without departing from the spirit and scope of the claimed invention.

We claim:

1. An apparatus for molding a hollow composite article having a plurality of internal webs, using a mold with the contour of the article to be produced and a means to heat said mold and composite, the improvement which comprises:

a plurality of expandable mandrel assemblies, each expandable mandrel assembly having sidewall members at least one of which is slidable, means to effect lateral displacement of said at least one slidable sidewall member, and an inflatable membrane surrounding said sidewall members of each expandable mandrel assembly;

means to accurately locate the position and insure the straightness of the internal webs;

means to seal said inflatable membrane of each expandable mandrel assembly to the mold and to adjacent inflatable membranes;

means to pressurize and inflate said inflatable membranes; and means to draw a vacuum between the inner mold surfaces and said inflatable membranes to capture a molded part therebetween.

2. The apparatus of claim 1 wherein the inflatable membranes are comprised of silicone rubber.

3. The apparatus of claim 1 wherein the means to effect lateral displacement of each said at least one slidable sidewall member comprises a plurality of pneumatic cylinders mounted inside said sidewall members of each expandable mandrel assembly.

4. The apparatus of claim 1 wherein the means to accurately locate the position of the internal webs is a plurality of locators mounted to the mold, which also position each expandable mandrel assembly within the mold cavity.

5. The apparatus of claim 1 wherein the means to seal the inflatable membranes to the mold is a nonhardening press-tight adhesive and flexible bagging film.

6. The apparatus of claim 1 wherein the means to heat the mold and the means to pressurize and inflate said inflatable membranes is an autoclave.

* * * * *